(12) United States Patent
Lee et al.

(10) Patent No.: US 10,620,819 B2
(45) Date of Patent: Apr. 14, 2020

(54) DISPLAY APPARATUS AND CONTROLLING METHOD THEREOF

(71) Applicant: SAMSUNG ELECTRONICS CO., LTD., Suwon-si, Gyeonggi-do (KR)

(72) Inventors: Hye-won Lee, Suwon-si (KR); Du-seong Kang, Hwaseong-si (KR); Sung-won Cho, Goyang-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 106 days.

(21) Appl. No.: 15/840,924

(22) Filed: Dec. 13, 2017

(65) Prior Publication Data

US 2018/0173395 A1 Jun. 21, 2018

(30) Foreign Application Priority Data

Dec. 20, 2016 (KR) .................. 10-2016-0174923

(51) Int. Cl.
G06F 3/0488 (2013.01)
B43L 1/00 (2006.01)
G06F 3/041 (2006.01)
G06F 3/0481 (2013.01)
G06F 3/01 (2006.01)
G06F 3/14 (2006.01)

(52) U.S. Cl.
CPC ........... *G06F 3/0488* (2013.01); *B43L 1/004* (2013.01); *G06F 3/017* (2013.01); *G06F 3/0416* (2013.01); *G06F 3/0481* (2013.01); *G06F 3/04883* (2013.01); *G06F 3/1454* (2013.01)

(58) Field of Classification Search
None
See application file for complete search history.

(56) References Cited

U.S. PATENT DOCUMENTS

| 8,059,105 | B2 | 11/2011 | Rosenberg et al. | |
|---|---|---|---|---|
| 9,335,926 | B2 | 5/2016 | Choi et al. | |
| 2011/0225553 | A1* | 9/2011 | Abramson | G06F 3/0481 715/863 |
| 2013/0222223 | A1* | 8/2013 | Brakensiek | G06F 3/017 345/156 |
| 2013/0293495 | A1 | 11/2013 | Choi et al. | |

(Continued)

FOREIGN PATENT DOCUMENTS

| EP | 2 508 965 A2 | 10/2012 |
|---|---|---|
| EP | 3 084 574 | 10/2016 |

(Continued)

OTHER PUBLICATIONS

Extended European Search Report dated Mar. 7, 2018, in corresponding European Patent Application No. 17206943.7, 8 pgs.

(Continued)

*Primary Examiner* — Sanjiv D. Patel
(74) *Attorney, Agent, or Firm* — Staas & Halsey LLP

(57) ABSTRACT

A display apparatus is provided. The display apparatus includes a display, a sensor to sense a touch on the display, a communicator, a storage configured to store matching information on which the display apparatus and at least one input source each match different touch types and a processor configured to, if it is identified that a touch type of the touch sensed by the sensor corresponds to a specific external input source based on the stored matching information, control the communicator to transmit information corresponding to the sensed touch to the specific external input source.

15 Claims, 10 Drawing Sheets

(56) References Cited

U.S. PATENT DOCUMENTS

| | | | |
|---|---|---|---|
| 2014/0215336 A1 | 7/2014 | Gärdenfors et al. | |
| 2014/0354553 A1* | 12/2014 | Dai | G06F 3/0416 |
| | | | 345/173 |
| 2015/0084873 A1 | 3/2015 | Hagenbuch et al. | |
| 2015/0339936 A1 | 11/2015 | Lee et al. | |
| 2016/0085419 A1 | 3/2016 | Carpenter et al. | |
| 2016/0321025 A1* | 11/2016 | Ikeda | G06F 3/0488 |
| 2016/0379385 A1* | 12/2016 | Tu | G06F 3/1454 |
| | | | 345/441 |
| 2019/0004621 A1* | 1/2019 | Nuber | G06F 3/038 |

FOREIGN PATENT DOCUMENTS

| | | |
|---|---|---|
| JP | 2014-85877 | 5/2014 |
| KR | 10-2013-0123691 | 11/2013 |
| KR | 10-2015-0031629 | 3/2015 |
| KR | 10-2015-0072318 | 6/2015 |
| KR | 10-2016-0069854 | 6/2016 |
| WO | WO 2015/093806 | 6/2015 |

OTHER PUBLICATIONS

International Search Report dated Mar. 19, 2018, in corresponding International Patent Application No. PCT/KR2017/014548, 8 pgs.
Written Opinion of the International Search Authority dated Mar. 19, 2018, in corresponding International Patent Application No. PCT/KR2017/014548, 7 pgs.
European Communication dated Apr. 5, 2019 in European Patent Application No. 17206943.7.

* cited by examiner

DISPLAY APPARATUS AND CONTROLLING METHOD THEREOF

CROSS-REFERENCE TO RELATED APPLICATIONS

This application claims priority from Korean Patent Application No. 10-2016-0174923, filed on Dec. 20, 2016 in the Korean Intellectual Property Office the disclosure of which is incorporated herein by reference in its entirety.

BACKGROUND OF THE INVENTION

Field of the Invention

Apparatuses and methods consistent with the present disclosure relate to a display apparatus and a controlling method thereof, and more particularly, to a display apparatus capable of supporting an electronic whiteboard and a controlling method thereof.

Description of the Related Art

Recently, various types of display apparatuses have been developed and popularized due to technological development in the display apparatus field. In particular, according to the flow of e-learning that utilizes electronic devices in the education field, an electronic whiteboard apparatus in which a display apparatus and a whiteboard are combined is widely used.

The electronic whiteboard may receive and display content from an external device by a touch, and may also display the functions of the electronic whiteboard itself.

However, in order to control the external device or the electronic whiteboard by the touch, there is a problem that a separate selection operation or switching operation for selecting a device to be controlled has to be performed.

Therefore, the need to control the external device or the electronic whiteboard without the operation of switching is increased.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present disclosure provides a display apparatus capable of controlling an external input source or a display apparatus by touch without a switching operation and a control method thereof.

According to an aspect of the present invention, a display apparatus includes: a display; a sensor to sense a touch on the display; a communicator; a storage configured to store matching information on which the display apparatus and at least one input source each match different touch types; and a processor configured to, if it is identified that a touch type of the sensed touch sensed by the sensor corresponds to a specific external input source based on the stored matching information, control the communicator to transmit information corresponding to the sensed touch to the specific external input source The processor may perform execute a function corresponding to the touch if it is identified that the touch type of the sensed touch sensed by the sensor corresponds to the display apparatus based on the stored matching information.

The processor may display a screen corresponding to the external input source, and transmits information corresponding to the sensed touch to the external input source if it is identified that the touch type of the sensed touch corresponds to the external input source.

The display apparatus may be implemented as an electronic whiteboard, and the processor may display the screen corresponding to the external input source, and transmit coordinate values corresponding to the sensed touch to the external input source if it is identified that the touch type of the sensed touch corresponds to the external input source, and perform a writing function according to the coordinate values corresponding to the sensed touch the processor identifies that the touch type of the sensed touch corresponds to the electronic whiteboard.

The display apparatus may be implemented as an electronic whiteboard, the processor may display the screen corresponding to the external input source and a screen corresponding to the electronic whiteboard in some region and the remaining region of the display, respectively, transmit the coordinate values corresponding to the sensed touch to the external input source if it is identified that the touch type of the sensed touch corresponds to the external input source, and perform a function corresponding to the coordinate values corresponding to the touch if it is identified that the touch type of the sensed touch corresponds to the electronic whiteboard.

The processor may identify the touch as a first touch type if it is identified that a touch area of the sensed touch is within a predetermined range, and identify the sensed touch as a second touch type if it that the touch area of the sensed touch exceeds the predetermined range.

The processor may identify the sensed touch as a first touch type if the sensed touch is performed by a first touch object, and identify the sensed touch as a second touch type if the sensed touch is performed by a second touch object.

According to another aspect of the present invention, a controlling method of a display apparatus communicating with at least one external input source includes: sensing a touch on a display included in the display apparatus; identifying a specific external input source which corresponds to a touch type of the sensed touch based on matching information on which each of the display apparatus and at least one input source matches different touch types; and transmitting information corresponding to the touch to the specific external input source if it is identified that the touch type of the sensed touch corresponds to a specific external input source.

The controlling method may further include: performing a function corresponding to the sensed touch if the touch type of the sensed touch corresponds to the display apparatus based on the matching information.

The controlling method may further include: displaying a screen corresponding to the external input source, the transmitting comprising transmitting information corresponding to the sensed touch to the external input source if it is identified that the touch type of the sensed touch corresponds to the external input source.

The controlling method may further include: performing, by the display apparatus implemented as an electronic whiteboard, a writing function according to a coordinate value corresponding to the sensed touch if it is identified that the touch type of the sensed touch corresponds to the electronic whiteboard.

The display apparatus may be implemented as an electronic whiteboard, and in the displaying, the screen corresponding to the external input source and a screen corresponding to the electronic whiteboard may be displayed in some region and the remaining region of the display, respectively, a function corresponding to the coordinate values corresponding to the sensed touch may be performed if it is identified that the touch type of the sensed touch corresponds to the electronic whiteboard, and the coordinate values corresponding to the sensed touch may be transmitted to the external input source if it is identified that the touch type of the sensed touch corresponds to the external input source.

In the identifying, the touch may be identified as a first touch type if it is identified that a touch area of the sensed touch is within a predetermined range, and the sensed touch may be identified as a second touch type if the touch area of the sensed touch exceeds the predetermined range In the identifying, the touch may be identified as the first touch type if the sensed touch is performed by the first touch object, and the sensed touch may be identified as the second touch type if the sensed touch is performed by the second touch object According to still another aspect of the present invention, there is provided a non-transitory readable medium stored with a program for executing a controlling method of a display apparatus communicating with at least one external input source, in which the controlling method includes: detecting a touch to a display included in the display apparatus; identifying a specific external input source which corresponds to a touch type of the sensed touch based on matching information on which each of the display apparatus and at least one input source matches different touch types; and transmitting information corresponding to the sensed touch to the specific external input source if it is identified the touch type of the sensed touch corresponds to the specific external input source.

According to various embodiments of the present disclosure as described above, it is possible to control the display apparatus or various external input sources based on the touch type to enhance the convenience of the user.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Hereinafter, various exemplary embodiments of the present disclosure will be described in detail with reference to the accompanying drawings.

Figure 1:
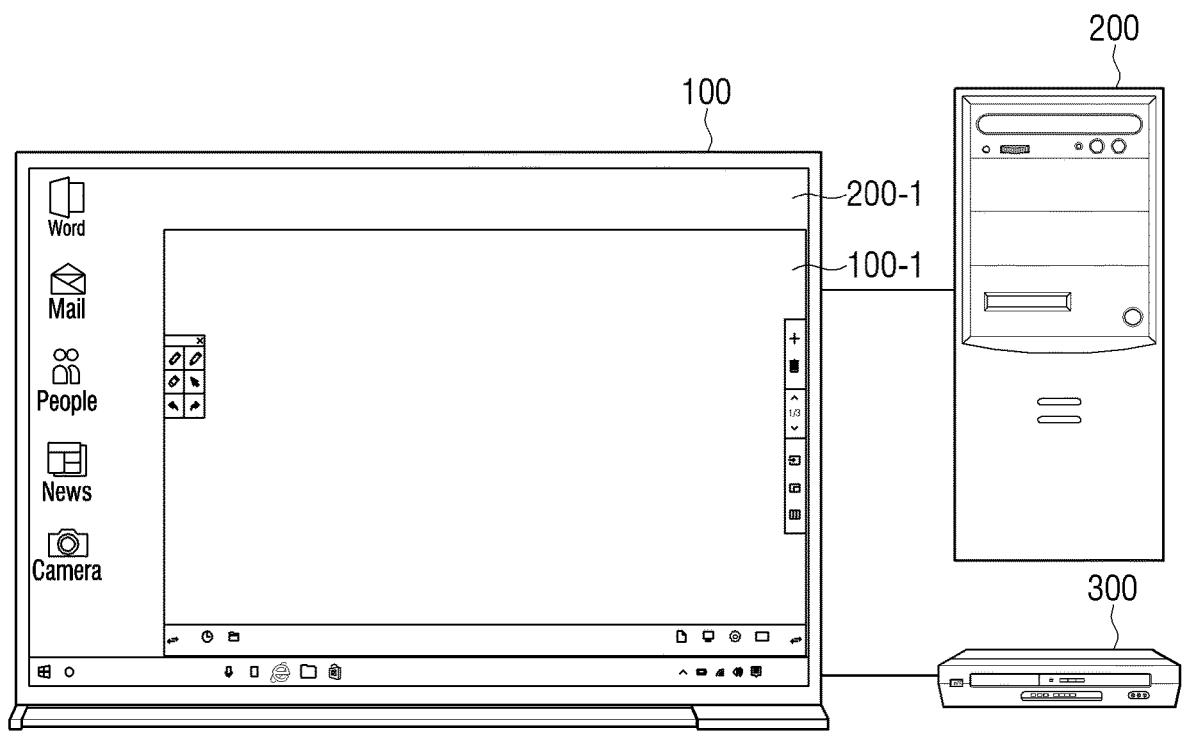
FIG. 1 is a diagram for describing a display apparatus and an external input source according to an exemplary embodiment of the present disclosure.

FIG. 1 is a diagram for describing a display apparatus and an external input source according to an exemplary embodiment of the present disclosure.

Referring to FIG. 1, a display apparatus 100 may communicate with at least one of external input sources 200 and 300. Here the external input sources 200 and 300 may be implemented as various types of electronic devices such as a desktop PC 200, a set top box 300, a smart phone (not shown), a tablet (not shown), and the like. Accordingly, the display apparatus 100 may display a screen corresponding to the external input sources 200 and 300. For example, if the display apparatus 100 communicates with the PC 200, the display apparatus 100 may display a screen 200-1 received from the PC 200.

In addition, the display apparatus 100 may display the screen 100-1 corresponding to the display apparatus 100. In this configuration, the screen 100-1 corresponding to the display apparatus 100 may be a screen capable of executing functions of the display apparatus 100 itself. For example, if the display apparatus 100 is implemented as an electronic whiteboard, a screen providing the electronic whiteboard function may be displayed. Here, the electronic whiteboard function may be a black or white screen and a writing function. However, the present disclosure is not limited thereto, and the screen 100-1 capable of executing all the functions performed in the general electronic whiteboard apparatus may be displayed.

In addition, as illustrated in FIG. 1, the display apparatus 100 may simultaneously display the screen 100-1 corresponding to the display apparatus 100 and the screen corresponding to the external input sources 200 and 300. Specifically, the display apparatus 100 may display the screens corresponding to the external input sources 200 and 300 in some region and the remaining region of the display 110, respectively and the screen 100-1 corresponding to the display apparatus 100 itself. However, the present disclosure is not limited thereto, and only any one of screens corresponding to a specific external input source or the display apparatus 100 may be displayed.

In addition, the display apparatus 100 may include a sensor for sensing (or detecting, obtaining) a touch. If the touch is sensed (or detected, obtained) by the sensor, the information corresponding to the detected touch may be transmitted to the external input source or the display apparatus 100 corresponding to the touch type of the detected touch. A specific exemplary embodiment of the touch type will be described later.

Figure 2A:
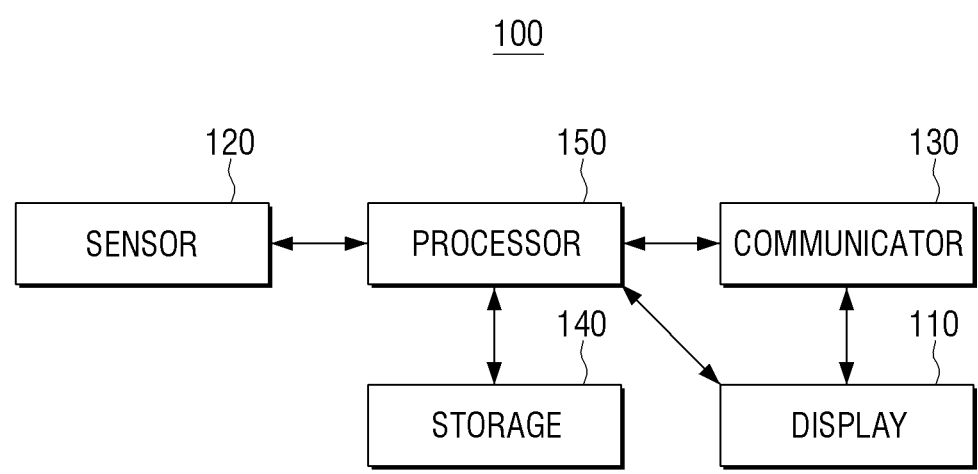
FIGS. 2A and 2B are block diagrams illustrating a configuration of a display apparatus according to an exemplary embodiment of the present disclosure.
Figure 2B:
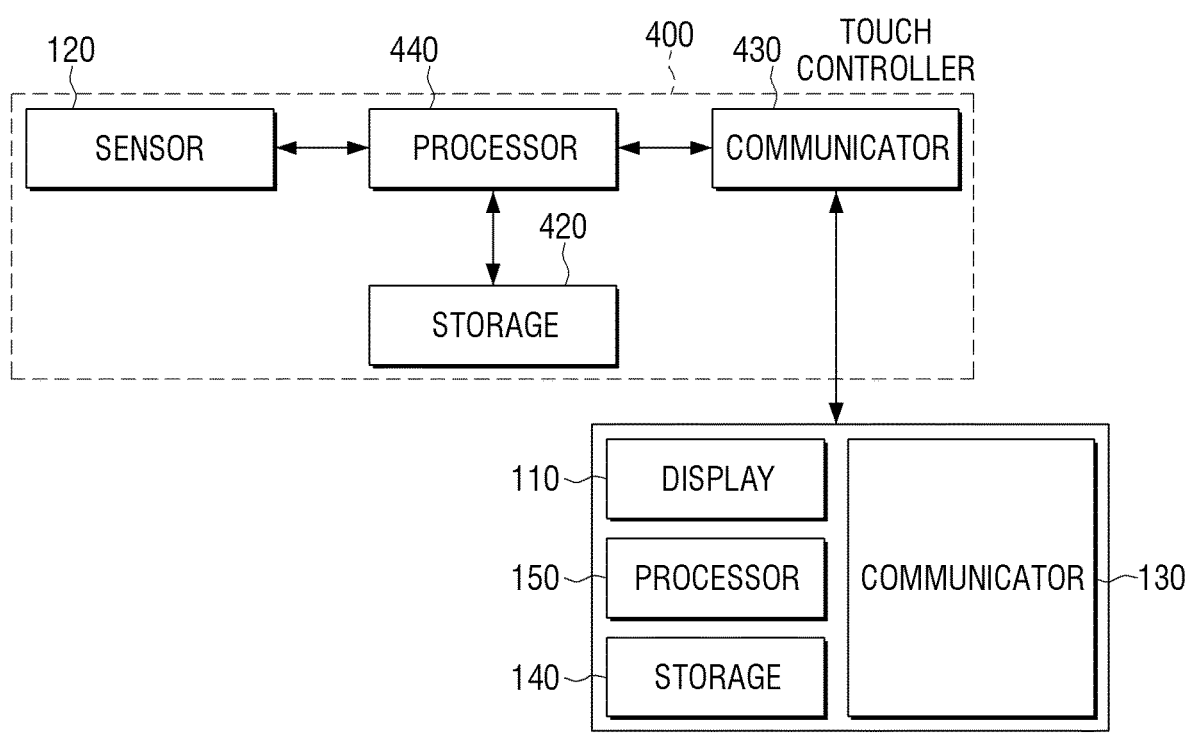

FIGS. 2A and 2B are block diagrams illustrating a configuration of a display apparatus according to an exemplary embodiment of the present disclosure.

Referring to FIG. 2A, the display apparatus 100 is configured to include the display 110, the sensor 120, the communicator 130, the storage 140, and the processor 150. In this configuration, the display apparatus 100 may be implemented as various types of electronic devices such as TV, an electronic whiteboard, an electronic table, and a large format display (LFD). Here, the electronic whiteboard means an electronic device that includes a touch screen panel implemented as an infrared touch screen using an IR sensor, a surface acoustic wave touch screen, a resistive touch screen (or a pressure sensitive type), a capacitive touch screen, or the like to perform writing using an electronic pen or a finger. However, the present disclosure is not limited thereto, and the electronic whiteboard may be implemented by a method of dividing a touch region using a camera, or the like.

In addition, the display apparatus 100 according to the exemplary embodiment of the present disclosure includes not only a case where the display apparatus 100 is implemented as the electronic whiteboard itself, but also a case where the display apparatus 100 is implemented as a general TV, an electronic table, an LFD, or the like that may perform the electronic whiteboard function.

The display 110 may display at least one screen of the display apparatus 100 itself and the screen received from the external input sources 200 and 300.

Further, the display 110 may display various contents such as all the moving picture images or still images, pictures, and documents which may be created as a plurality of images such as a movie, a drama, a recorded image, and a slow video and displayed at a predetermined frame ratio.

Further, the display 110 may display a user interface screen which includes various kinds of menus. The user interface screen may include various kinds of menus, for example, volume up/down, channel up/down, environment setting menus, and the like which control the display apparatus 100.

In particular, the display 110 may display the screen providing the electronic whiteboard function. The screen providing the electronic whiteboard function may be displayed together with a black or white background image, in which the background image may be provided with a transparent screen by transparency adjustment. Here, the electronic whiteboard function means all the functions performed by the general electronic whiteboard apparatus, which will be described later.

In addition, the display 110 may be implemented as a liquid crystal display (LCD), an organic light emitting display (OLED), a plasma display panel (PDP), or the like.

The sensor 120 may detect a touch to the display 110. In detail, the sensor 120 may be implemented as various types of sensors. Therefore, it may be realized as a touch sensor for recognizing a touch, a motion sensor for detecting a user' motion, and a sensor for detecting a movement and trajectory of an electronic pen, or the like.

The communicator 130 may communicate with at least one external input sources 200 and 300. Specifically, the display apparatus 100 may be connected to the external input sources 200 and 300 by using the communicator 130 in a wired or wireless manner. Accordingly, the communicator 130 may perform data communication with the external input source through a USB, a serial port, Wi-Fi, Bluetooth, or the like. Needless to say, the supportable standard is not limited to the above-described example, and it is possible to support standards of other formats. Accordingly, the display apparatus 100 may display the screens corresponding to the external input sources 200 and 300 by the communicator 130.

The storage 140 may store various data, programs or applications for driving/controlling the display apparatus 100.

The storage 140 may store a control program for controlling the display apparatus 100 and the processor 150, applications first provided from manufacturers or downloaded from the outside, a graphical user interface (hereinafter, referred to as GUI) associated with the applications, objects (for example, image text, icon, button, etc.) for providing the GUI, user information, document, databases, or related data.

The storage 140 may include memory cards (e.g., micro SD card, USB memory, or the like) equipped in the display apparatus 100, a nonvolatile memory, a volatile memory, a hard disk derive (HDD), or a solid state drive (SSD).

In addition, when the display apparatus 100 is implemented as the electronic whiteboard, the storage 140 stores a program for performing the electronic whiteboard function. In order to provide the screen for performing the electronic whiteboard function in the display 110, the program for performing the electronic whiteboard function stored in the storage 140 needs to be performed by the processor 150. The program for performing the electronic whiteboard function may be stored from the design of the display apparatus 100, but may be updated in a firmware type. The update of the firmware type may be performed using the communicator 130 in the wired or wireless communication.

In particular, the storage 140 may store matching information on which the display apparatus 100 and at least one external input sources 200 and 300 each match different touch types.

However, the matching information according to the exemplary embodiment of the present disclosure may be implemented as a first storage in which data associated with a general function of the display apparatus 100, for example, various data, programs, or applications for driving/controlling the display apparatus 100 and a second storage in which data associated with a touch function, for example, matching information is stored. The first storage may be implemented as a memory provided inside the processor 150 and/or a memory provided outside the processor 150, and the second storage may be implemented by a processor (not shown) provided inside a touch controller and/or a memory provided outside the processor which will be described later.

Here, the matching information is information indicating a matching relationship between the type of the touch detected by the sensor 120 and the display apparatus or the external input source. For example, a first touch type of the touch detected by the sensor 120 may have a matching relationship with the display apparatus, and the second touch type may have a matching relationship with the PC 200 among a plurality of external input sources. Accordingly, the matching information stored in the storage 140 may include information that matches each of the at least one external input source communicating with the display apparatus 100 and the display apparatus 100 with different touch types.

Here, the different touch types may be determined (or identified) by classifying the touches detected by the sensor 120 based on a predetermined reference. For example, if the predetermined reference is the touch area, the touch type may be classified based on the touch area of the touch detected by the sensor 120. Also, if the predetermined reference is a touch object, the touch type can be classified based on the touch object which is touched.

The processor 150 controls the operation of the display apparatus 100 as a whole. Therefore, the processor 150 accesses the storage 140 to perform booting using an O/S stored in the storage 140. Further, the processor 150 executes various operations using various programs, contents, data, and the like which are stored in the storage 140.

In particular, the processor 150 may determine (or identify) whether the touch type of the touch detected by the sensor 120 corresponds to a specific external input source based on the matching information.

Specifically, the processor 150 may determine the touch type of the touch detected by the sensor 120, and determine whether there is the external input source matching the determined touch type based on the matching information stored in the storage 140.

On the other hand, if the display apparatus 100 includes the touch controller as described later, the processor included in the touch controller may determine whether the touch type corresponds to a specific external input source based on the matching information stored in the storage.

For example, if the touch is detected by the sensor 120 and the touch type of the detected touch is determined as the first touch type, the processor 150 (or processor provided in the touch controller) may determine an external input source corresponding to the first touch type.

If the processor 150 determines that the touch type corresponds to a specific external input source, the processor 150 may transmit the information corresponding to the detected touch to the specific external input source. Here, an example of the information corresponding to the detected touch may include coordinate value information (relative coordinate information and absolute coordinate information) of the touch detected on the display 110, a menu for the external input source displayed at coordinate positions of the detected touch, a function, or the like. For example, if the touch of the user is detected, the processor 150 may calculate coordinate information (X and Y coordinates) corresponding to the touch position using the information pre-stored in the storage 140 and transmit the coordinate information to the communicator 130. Alternatively, for example, it is possible to transmit coordinate information (X, Y, Z coordinates) depending on a touch pressure.

In addition, if it is determined that the touch type of the touch detected by the sensor 120 corresponds to the display apparatus 100 based on the matching information, the processor 150 may perform a function according to the coordinate value corresponding to the detected touch. Here, the function according to the coordinate value may be a menu, a function, or the like for the display apparatus 100 displayed at the coordinate values of the touch detected on the display 110. For example, when the touch of the user is detected, the processor 150 may calculate the coordinate information (X and Y coordinates) corresponding to the touch position to display an image corresponding to the calculated coordinate information or perform a function.

On the other hand, if the display apparatus 100 includes the touch controller as described later, the processor included in the touch controller may determine whether the touch type corresponds to the display apparatus 100 based on the matching information stored in the storage.

For example, it may be considered that the display apparatus 100 is implemented as the electronic whiteboard and the display 110 displays the screen providing the electronic whiteboard function. In this case, the processor 150 (or processor provided in the touch controller) may execute the electronic whiteboard function displayed at the coordinate values of the detected touch. Here, the electronic whiteboard function may include a writing function (handwriting input function), an editing function, a video playback function, a handwritten screen saving function, or the like.

The writing function may be performed by a touch input by a user operation or an input by an electronic pen, and the processor 150 may execute a function or an application corresponding to the input.

The editing function may include a function of erasing, correcting, and copying input characters or a function of changing a size, a font, a color, a type style, etc., of characters, and the like, and may also include a commonly used document editing function.

The video playback function also means a function of playing a video image, a still image, etc., even on the electronic whiteboard.

However, the electronic whiteboard function is not limited to the above-described functions and may include all the functions used in the electronic whiteboard apparatus.

Referring to FIG. 2B according to another exemplary embodiment of the present disclosure, the touch function among the functions of the above-described display apparatus 100 may also be performed by the touch controller 400 separately provided in the display apparatus 100. For example, the touch controller 400 may be provided in a touch module (not shown). The touch controller 400 may include the sensor 120, a storage 420, a communicator 430, and a processor 440. In this case, the storage 400 provided in the touch controller 400 may store matching information on which the display apparatus 100 and at least one external input sources 200 and 300 each match different touch types. Data associated with other data related to other functions of the display apparatus 100 may be stored in the storage 140 as described above.

In addition, the processor 440 included in the touch controller 400 may control the operation related to the touch function according to the exemplary embodiment of the present disclosure. For example, the processor 440 included in the touch controller 400 may determine whether the touch type of the touch detected by the sensor 120 corresponds to the specific external input source based on the matching information stored in the storage 420 provided in the touch controller 400. In addition, if it is determined that the touch type corresponds to a specific external input source, the processor 440 may transmit the information corresponding to the detected touch to the specific external input source. The operation related to other functions of the display apparatus 100 may be controlled by the processor 140 as described above.

The communicator 430 provided in the touch controller 400 may perform data communication with the external input source through a USB, a serial port, Wi-Fi, Bluetooth, or the like. Needless to say, the supportable standard is not limited to the above-described example, and it is possible to support standards of other formats.

Hereinafter, the detailed exemplary embodiment of the touch type and the matching information will be described below in detail.

Figure 3A:
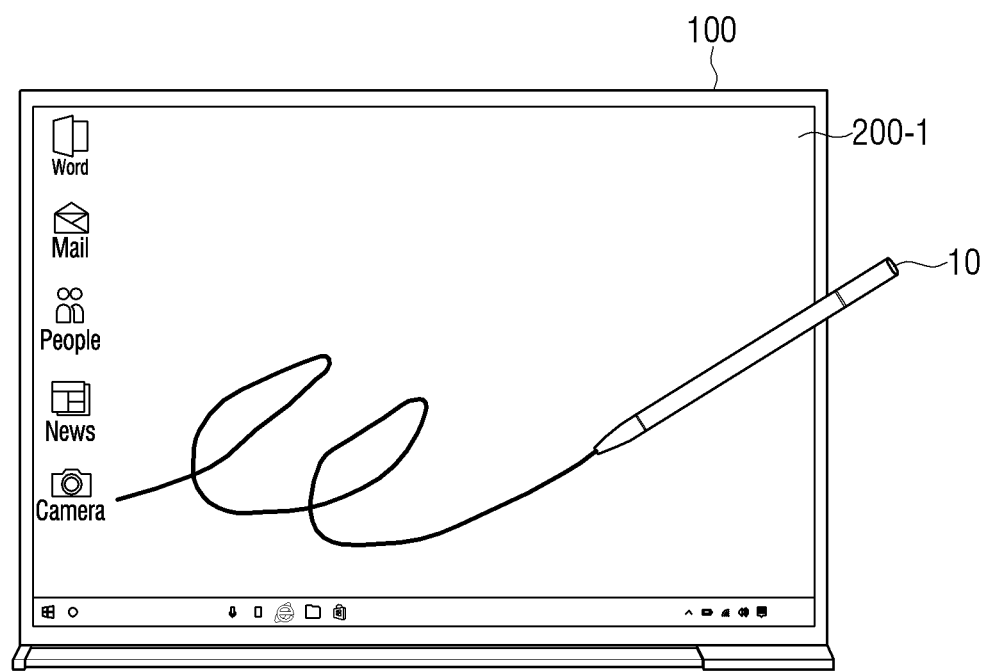
FIGS. 3A and 3B are diagrams for describing matching information according to the exemplary embodiment of the present disclosure.
Figure 3B:
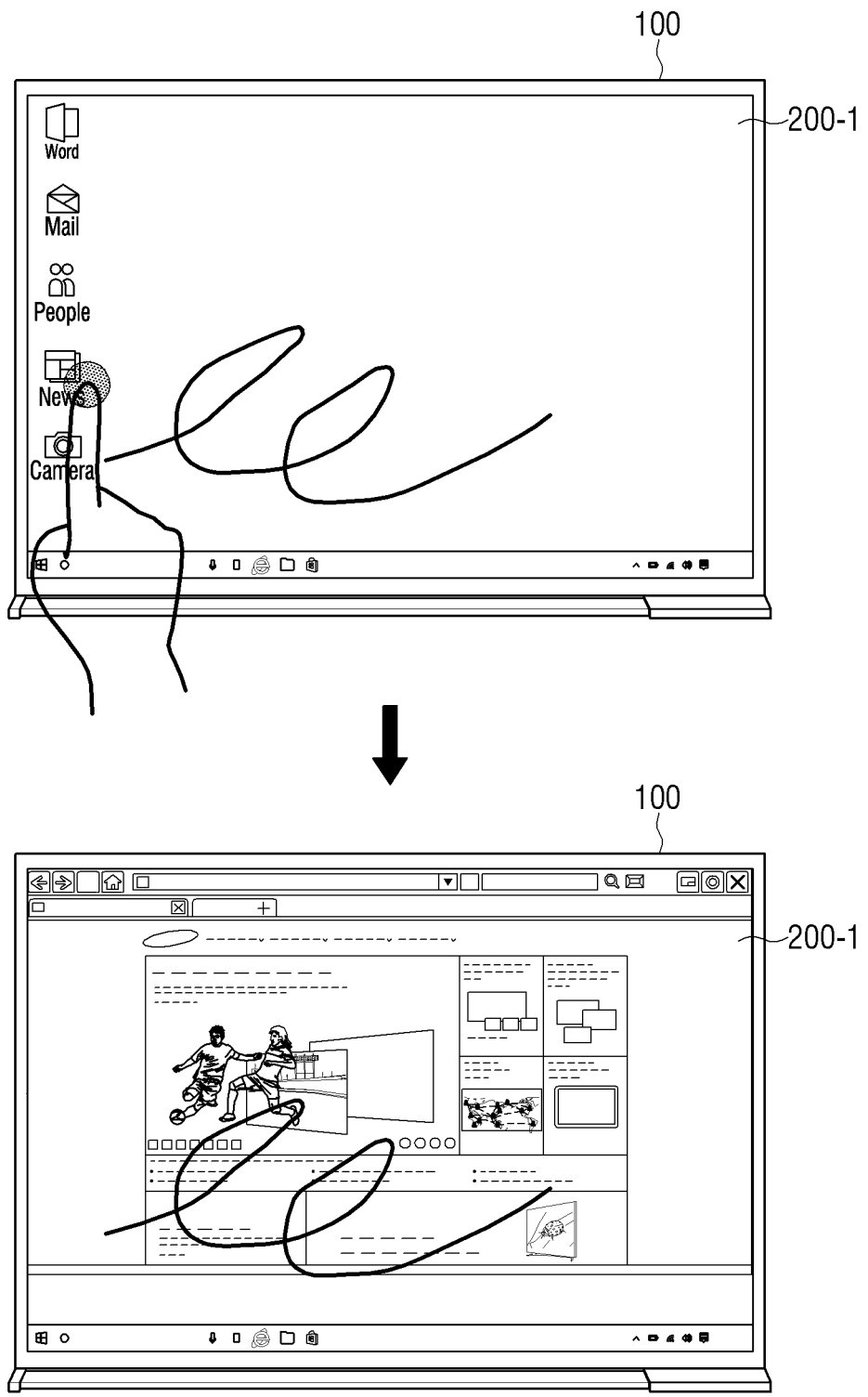

FIGS. 3A and 3B are diagrams for describing matching information according to the exemplary embodiment of the present disclosure.

Referring to FIG. 3A, the display apparatus 100 may display a screen 200-1 corresponding to at least one of external input sources 200 and 300.

The sensor 120 provided in the display apparatus 100 may sense a touch to the display. In this case, the processor 150 may determine the touch type of the detected touch. In this case, the touch type means that the detected touch is classified based on a predetermined reference. The predetermined reference may be set variously such as the touch area, the touch object, and the touch pattern.

The processor 150 may transmit the coordinate value corresponding to the touch detected as the external input source corresponding to the touch type, based on the matching information. In addition, the processor 150 may also transmit the information corresponding to the coordinate values.

In addition, if it is determined that the touch type of the touch detected by the sensor corresponds to the display apparatus 100 based on the matching information, the processor 150 may perform a function corresponding to the coordinate value corresponding to the detected touch.

On the other hand, as described above, the display apparatus 100 may be implemented as various types of electronic apparatuses such as a TV, an electronic whiteboard, an electronic table, and an LFD. However, in the following description, the display apparatus 100 is assumed to be an electronic board for convenience of explanation.

As shown in FIG. 3A, the sensor 120 provided on the electronic whiteboard may detect the touch by the electronic pen 10. In this case, the processor 150 may determine the external input source corresponding to the touch type based on the matching information. In addition, the processor 150 may also determine that the touch type corresponds to the electronic whiteboard based on the matching information.

For example, the processor 150 may determine that the touch performed by the electronic pen 10 corresponds to the electronic whiteboard, based on the matching information.

In this case, the processor 150 may execute a function according to the coordinate values corresponding to the touch performed by the electronic pen 10. Here, the function according to the coordinate value means the electronic board function. Specifically, the electronic whiteboard function may include a writing function (handwriting input function), an editing function, a video playback function, a handwritten screen saving function, or the like.

Accordingly, as shown in FIG. 3A, if it is determined that the touch type of the detected touch corresponds to the electronic whiteboard, the processor 150 may perform the writing function according to the coordinate values corresponding to the detected touch.

FIG. 3B is a diagram for explaining the case where it is determined that the touch type corresponds to the external input source according to the exemplary embodiment of the present disclosure.

According to FIG. 3B, the processor 150 may determine that the touch type corresponds to the specific external input source, based on the matching information. In this case, the processor 150 may transmit the coordinate values corresponding to the touch detected by the specific external input source. In addition, the processor 150 may also transmit the information corresponding to the coordinate values.

For example, the processor 150 may determine that a touch performed by the finger 20 corresponds to the PC 200 among the external input sources 200 and 300 based on the matching information. Accordingly, if the screen 200-1 corresponding to the PC 200 is displayed and it is determined that the touch type corresponds to the PC 200 among the external input sources 200 and 300, the processor 150 may transmit the coordinate values corresponding to the detected touch to the PC 200.

Therefore, the electronic whiteboard or the plurality of external input sources may be controlled by a touch without a process of selecting or switching a device to be controlled by a touch.

Hereinafter, various references for classifying the touch type will be described.

Figure 4A:
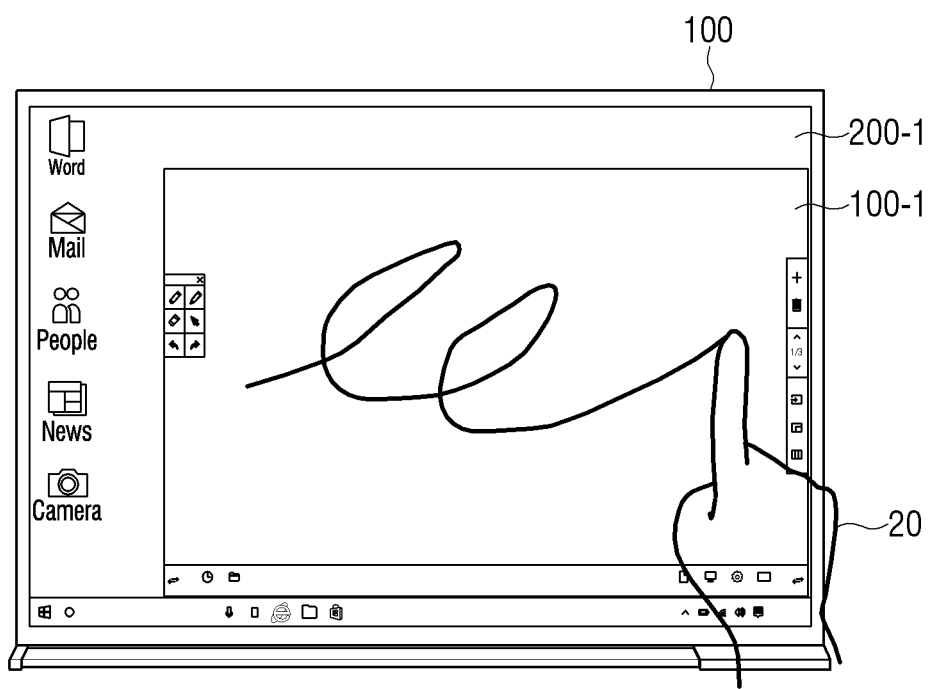
FIGS. 4A and 4B are views for explaining various ways of determining a touch type based on a touch area according to an exemplary embodiment of the present disclosure.
Figure 4B:
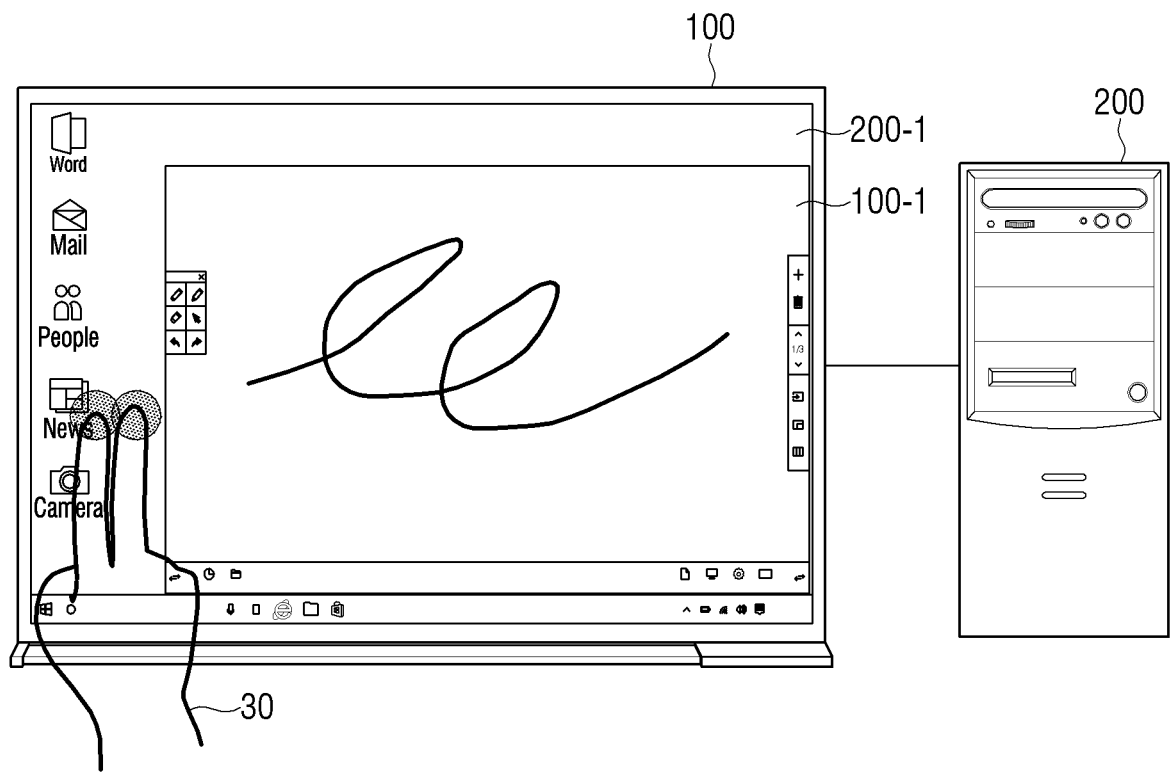

FIGS. 4A and 4B are views for explaining various ways of determining a touch type based on a touch area according to an exemplary embodiment of the present disclosure.

As shown in FIG. 4A, the processor 150 may determine that the touch type corresponds to the electronic whiteboard. Specifically, the touch type is classified based on the touch area, and if the touch area of the detected touch is within a predetermined range, the touch type may be determined to be the first touch type, and if the touch area exceeds the predetermined range, the touch type may be determined to be the second touch type.

For example, it may be considered that the first touch type corresponds to the electronic whiteboard and the second touch type corresponds to the PC 200 based on the matching information. In this case, as shown in FIG. 4A, the area corresponding to the one finger 20 is within a predetermined range, and the processor 150 may determine that the touch performed by the finger 20 is the first touch type. Accordingly, the processor 150 may execute the electronic whiteboard function based on the coordinate values corresponding to the detected touch.

In addition, as shown in FIG. 4B, an area corresponding to two fingers 30 exceeds a predetermined range, and the processor 150 may determine that the touch performed by the two fingers 30 is the second touch type. Accordingly, the processor 150 may transmit the coordinate values corresponding to the detected touch to the PC 200. However, the predetermined range of the touch area may be changed according to the setting of the user.

Figure 5A:
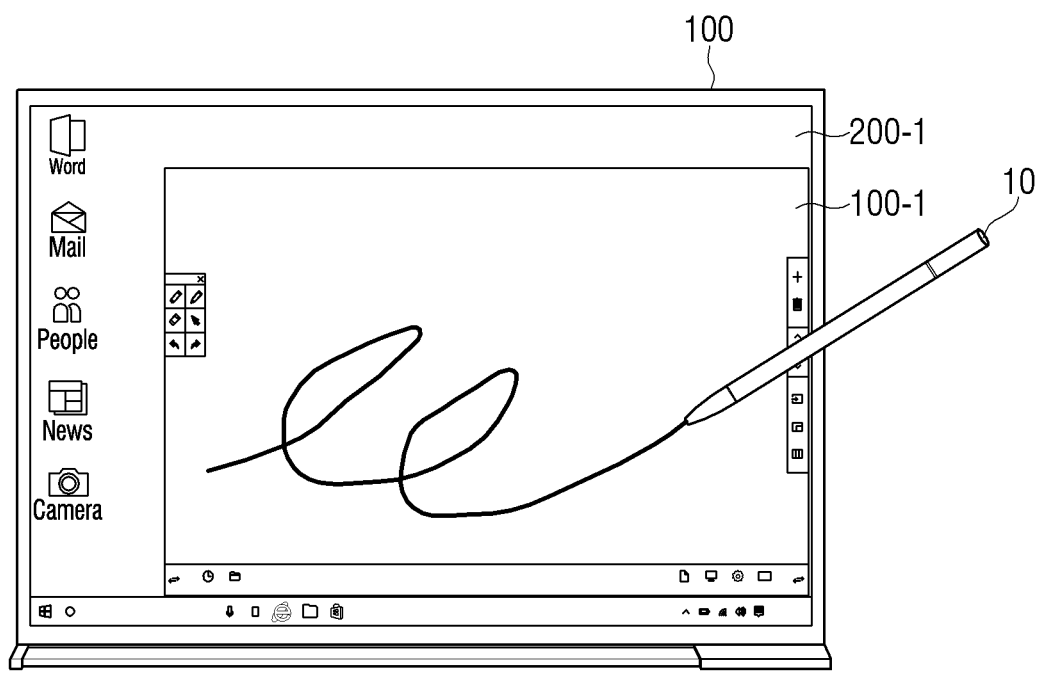
FIGS. 5A and 5B are views for explaining various ways of determining a touch type based on a touch object according to an exemplary embodiment of the present disclosure.
Figure 5B:
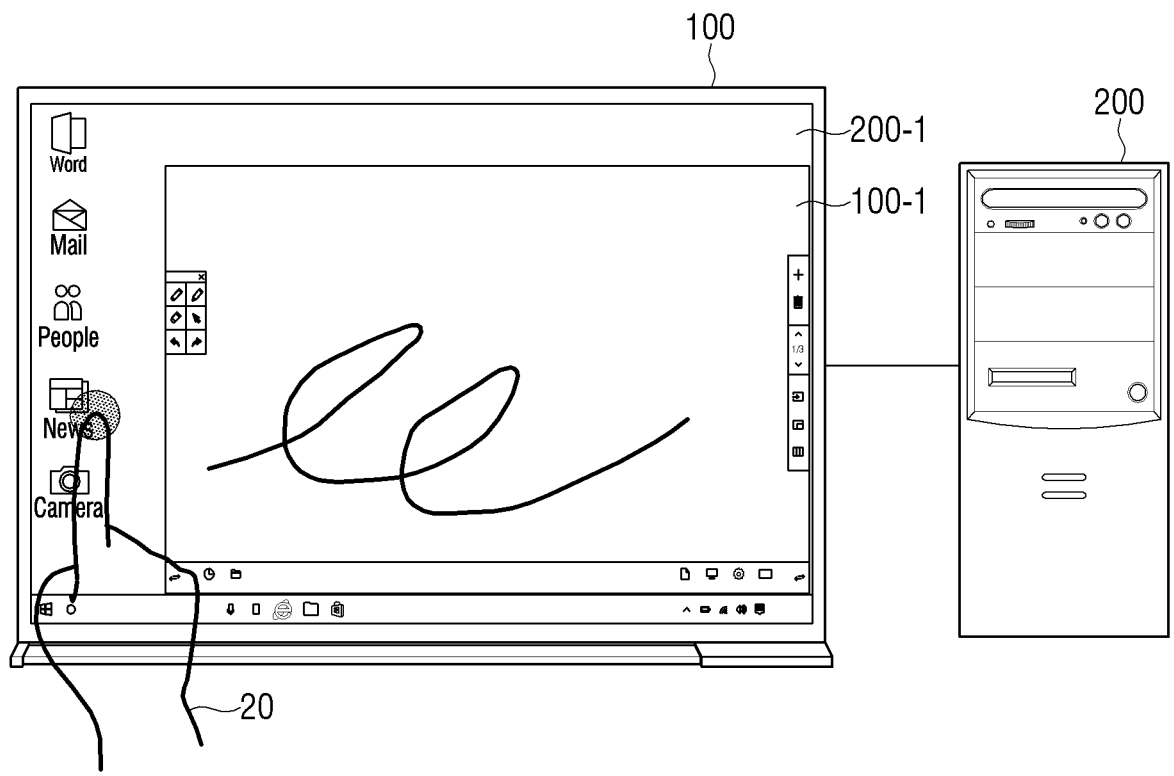

FIGS. 5A and 5B are views for explaining various ways of determining a touch type based on a touch object according to an exemplary embodiment of the present disclosure.

As shown in FIG. 5A, the processor 150 may determine that the touch type corresponds to the electronic whiteboard.

The touch type may be classified based on the touch object. Here, the touch object refers to a matter to be touched. Specifically, the processor 150 may determine that the detected touch is the first touch type if the detected touch is performed by the first touch object, and determine the second touch type if the detected touch is performed by the second touch object.

For example, it may be considered that the first touch type corresponds to the electronic whiteboard and the second touch type corresponds to the PC 200 based on the matching information. In this case, as shown in FIG. 5A, if the touch is performed by the electronic pen 10, the processor 150 may determine the detected touch as the first touch type. Accordingly, the processor 150 may execute the electronic whiteboard function based on the coordinate values corresponding to the detected touch.

Also, as shown in 5b, the processor 150 may determine that the touch performed by the finger 20 is the second touch type. Accordingly, the processor 150 may transmit the coordinate values corresponding to the detected touch to the PC 200. However, the touch type according to the touch object may be changed by the setting of the user.

Figure 6:
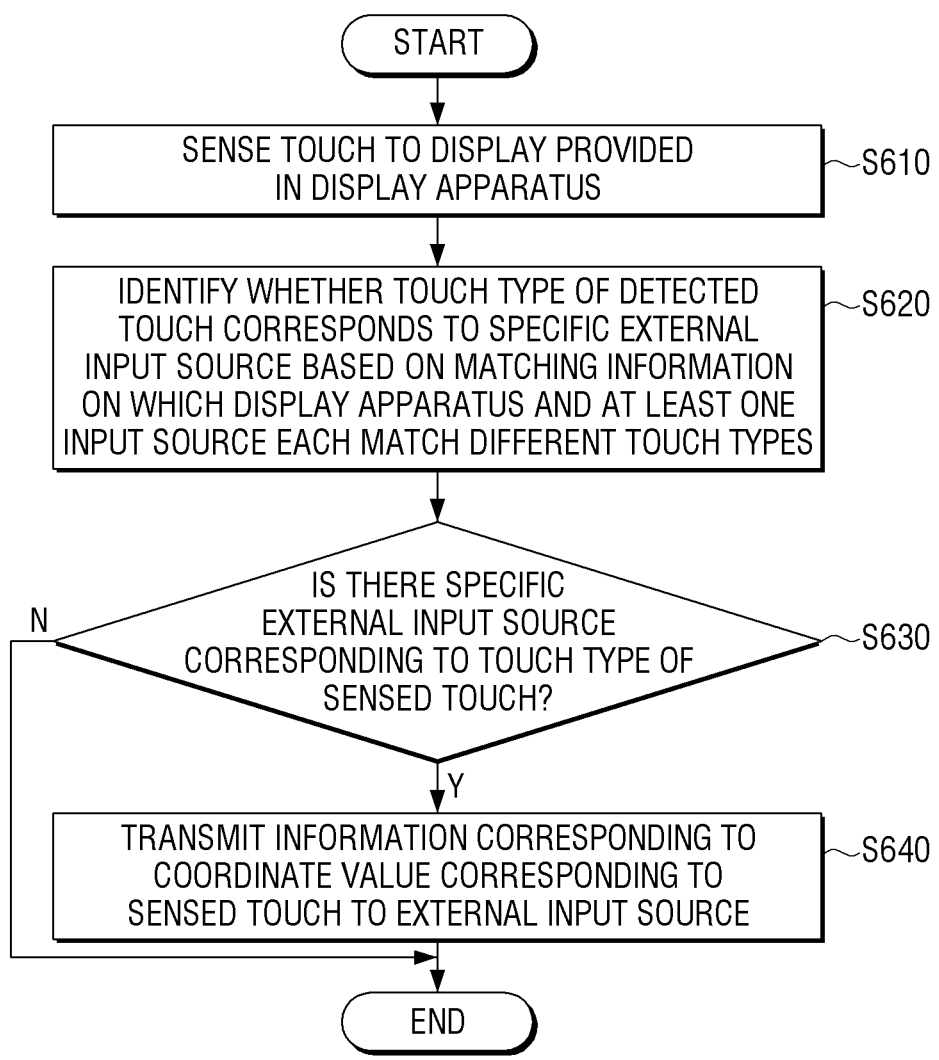
FIG. 6 is a flow chart for describing a controlling method of a display apparatus according to an exemplary embodiment of the present disclosure.

FIG. 6 is a flow chart for describing a controlling method of a display apparatus according to an exemplary embodiment of the present disclosure.

According to the method shown in FIG. 6, the touch to the display provided in the display apparatus is detected (S610), and each of the display apparatus and the at least one input source determines whether the touch type of the detected touch corresponds to the specific external input source based on the matching information on which the display apparatus and at least one input source each match different touch types (S620).

If it is determined that the touch type of the detected touch corresponds to the specific external input source (S630: Y), the information corresponding to the detected touch is transmitted to the external input source (S640).

In addition, if it is determined that the touch type of the detected touch corresponds to the display apparatus based on the matching information, the controlling method may execute the function corresponding to the detected touch.

In addition, the controlling method includes displaying and transmitting the screen 200-1 corresponding to the external input source, in the displaying and transmitting of the screen 200-1, the information corresponding to the detected touch may be transmitted to the external input source if the touch type of the detected touch corresponds to the external input source.

Meanwhile, the display apparatus is implemented as the electronic whiteboard. In this case, if it is determined that the touch type of the detected touch corresponds to the electronic whiteboard, the controlling method may perform the writing function based on the coordinate values corresponding to the detected touch.

In addition, in the displaying, the screen corresponding to the external input source and the screen corresponding to the electronic whiteboard in some region and the remaining region of the display are displayed, and the controlling method may perform the function corresponding to the coordinate value corresponding to the detected touch if the touch type of the detected touch corresponds to the electronic whiteboard and transmit the coordinate values corresponding to the detected touch to the external input source if the touch type of the detected touch corresponds to the external input source.

Meanwhile, in the determining, if it is determined that the touch area of the detected touch is within the predetermined range, the detected touch is determined as the first touch type, and if the touch area of the detected touch exceeds the predetermined range, the detected touch is determined as the second touch type.

In addition, in the determining, the detected touch is determined as the first touch type if the detected touch is performed by the first touch object, and the detected touch is determined as the second touch type if the detected touch is performed by the second touch object.

Further, a non-transitory computer readable medium in which a program sequentially performing the controlling method according to the present disclosure is stored may be provided.

Specifically, in a non-transitory readable medium storing a program for performing a controlling method of a display apparatus communicating with at least one external input source, the controlling method includes: detecting a touch to a display provided in the display apparatus; determining whether or not a touch type of the detected touch corresponds to a specific external input source based on matching information on which each of the display apparatus and at least one input source matches different touch types, and transmitting information corresponding to the detected touch to an external input source if it is determined that the touch type of the detected touch in the determining corresponds to a specific external input source.

The non-transitory computer readable medium is not a medium that stores data for a while, such as a register, a cache, and a memory, but means a medium that semi-permanently stores data and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the invention as disclosed in the accompanying claims. These modifications should also be understood to fall within the scope of the present disclosure.

What is claimed is:

1. A display apparatus, comprising:
   a display configured to display an image including at least two areas;
   a sensor to sense a touch on the display from at least one of a finger of a user and an electronic pen on coordinate values in one of the at least two areas;
   a communicator;
   a storage configured to store matching information on which the display apparatus and at least one input source each match different touch types corresponding to the finger of the user and the electronic pen based on the coordinate values; and
   a processor configured to, in response to a touch type of the touch sensed by the sensor corresponding to a specific external input source and the display displaying a screen corresponding to the specific external input source, control the communicator to transmit information corresponding to the sensed touch to the specific external input source,
   wherein a first touch type of the different touch types corresponds to a first area of the at least two areas, and a second touch type of the different touch types corresponds to a second area of the at least two areas, and
   wherein the display apparatus or the at least one external input source is controlled by the different touch types without a process of selecting or switching a device to be controlled by the sensed touch.

2. The display apparatus as claimed in claim 1, wherein the processor is configured to execute a function corresponding to the sensed touch if it is identified that the touch type of the sensed touch sensed by the sensor corresponds to the display apparatus based on the stored matching information.

3. The display apparatus as claimed in claim 1, wherein the processor displays a screen corresponding to the external input source, and transmits information corresponding to the sensed touch to the external input source if it is identified that the touch type of the sensed touch corresponds to the external input source.

4. The display apparatus as claimed in claim 3, wherein the display apparatus is implemented as an electronic whiteboard, and
   wherein the processor configured to:
   display the screen corresponding to the external input source, and transmit coordinate values corresponding to the sensed touch to the external input source if it is identified that the touch type of the sensed touch corresponds to the external input source, and
   perform a writing function according to the coordinate values corresponding to the sensed touch if it is identified that the touch type of the sensed touch corresponds to the electronic whiteboard.

5. The display apparatus as claimed in claim 3, wherein the display apparatus is implemented as an electronic whiteboard, and wherein the processor configured to:
 display the screen corresponding to the external input source and a screen corresponding to the electronic whiteboard in some region and the remaining region of the display, respectively,
 transmit the coordinate values corresponding to the sensed touch to the external input source if it is identified that the touch type of the sensed touch corresponds to the external input source, and
 perform a function corresponding to the coordinate values corresponding to the sensed touch if it is identified that the touch type of the sensed touch corresponds to the electronic whiteboard.

6. The display apparatus as claimed in claim 1, wherein the processor identifies the touch as a first touch type if it is identified that a touch area of the sensed touch is within a predetermined range, and identifies the sensed touch as a second touch type if the touch area of the sensed touch exceeds the predetermined range.

7. The display apparatus as claimed in claim 1, wherein the processor identifies the sensed touch as a first touch type if the sensed touch is performed by a first touch object, and identifies the sensed touch as a second touch type if the sensed touch is performed by a second touch object.

8. A controlling method of a display apparatus communicating with at least one external input source, comprising:
 sensing a touch on a display included in the display apparatus from at least one of a finger of a user and an electronic pen on coordinate values in one of at least two areas of an image of the display apparatus;
 displaying a screen corresponding to a specific external input source;
 identifying the specific external input source which corresponds to a touch type of the sensed touch based on matching information on which each of the display apparatus and at least one input source matches different touch types corresponding to the finger of the user and the electronic pen based on the coordinate values; and
 transmitting information corresponding to the sensed touch to the specific external input source if it is identified that the touch type of the sensed touch corresponds to a specific external input source,
 wherein a first touch type of the different touch types corresponds to a first area of the at least two areas, and a second touch type of the different touch types corresponds to a second area of the at least two areas, and
 wherein the display apparatus or the at least one external input source is controlled by the different touch types without a process of selecting or switching a device to be controlled by the sensed touch.

9. The controlling method as claimed in claim 8, further comprising:
 performing a function corresponding to the sensed touch if the touch type of the sensed touch corresponds to the display apparatus based on the matching information.

10. The controlling method as claimed in claim 8, further comprising:
 displaying a screen corresponding to the external input source,
 wherein the transmitting comprises transmitting information corresponding to the sensed touch to the external input source if it is identified that the touch type of the sensed touch corresponds to the external input source.

11. The controlling method as claimed in claim 10, further comprising
 performing, by the display apparatus implemented as an electronic whiteboard, a writing function according to a coordinate value corresponding to the sensed touch if it is identified that the touch type of the sensed touch corresponds to the electronic whiteboard.

12. The controlling method as claimed in claim 10, wherein the display apparatus is implemented as an electronic whiteboard, and
 the displaying further comprises displaying the screen corresponding to the external input source and a screen corresponding to the electronic whiteboard in some region and the remaining region of the display, respectively,
 performing a function corresponding to the coordinate values corresponding to the sensed touch if it is identified that the touch type of the sensed touch corresponds to the electronic whiteboard, and
 transmitting the coordinate values corresponding to the sensed touch to the external input source if it is identified that the touch type of the sensed touch corresponds to the external input source.

13. The controlling method as claimed in claim 8, wherein in the identifying, the sensed touch is identified as a first touch type if it is identified that a touch area of the sensed touch is within a predetermined range, and the sensed touch is identified as a second touch type if the touch area of the touch exceeds the predetermined range.

14. The controlling method as claimed in claim 8, wherein in the identifying, the sensed touch is identified as the first touch type if the sensed touch is performed by the first touch object, and the sensed touch is identified as the second touch type if the touch is performed by the second touch object.

15. A non-transitory computer readable medium stored with a program for executing a controlling method of a display apparatus communicating with at least one external input source, wherein the controlling method includes:
 sensing a touch on a display included in the display apparatus from at least one of a finger of a user and an electronic pen on coordinate values in one of at least two areas of an image of the display apparatus;
 displaying a screen corresponding to a specific external input source;
 identifying the specific external input source which corresponds to a touch type of the sensed touch based on matching information on which each of the display apparatus and at least one input source matches different touch types corresponding to the finger of the user and the electronic pen based on the coordinate values; and
 transmitting information corresponding to the sensed touch to the specific external input source if it is identified that the touch type of the sensed touch corresponds to the specific external input source,
 wherein a first touch type of the different touch types corresponds to a first area of the at least two areas, and a second touch type of the different touch types corresponds to a second area of the at least two areas, and
 wherein the display apparatus or the at least one external input source is controlled by the different touch types without a process of selecting or switching a device to be controlled by the sensed touch.

* * * * *